(12) United States Patent
Wanner et al.

(10) Patent No.: US 12,330,055 B2
(45) Date of Patent: Jun. 17, 2025

(54) DYNAMIC NETWORK COVERAGE FOR MULTI-USER, MULTI-DEVICE EXPERIENCE

(71) Applicant: Dell Products L.P., Round Rock, TX (US)

(72) Inventors: Nicholas Wanner, Austin, TX (US); Harpreet Narula, Austin, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 440 days.

(21) Appl. No.: 18/066,050

(22) Filed: Dec. 14, 2022

(65) Prior Publication Data

US 2024/0198217 A1  Jun. 20, 2024

(51) Int. Cl.
| | |
|---|---|
| *A63F 13/31* | (2014.01) |
| *A63F 13/24* | (2014.01) |
| *H04B 7/06* | (2006.01) |
| *H04B 17/29* | (2015.01) |

(52) U.S. Cl.
CPC .............. *A63F 13/31* (2014.09); *A63F 13/24* (2014.09); *H04B 7/0617* (2013.01); *H04B 17/29* (2015.01)

(58) Field of Classification Search
CPC ....... A63F 13/31; A63F 13/24; H04B 7/0617; H04B 17/29
See application file for complete search history.

(56) References Cited

U.S. PATENT DOCUMENTS

| 12,274,932 B2* | 4/2025 | Dorn ..................... A63F 13/217 |
| 2018/0041270 A1* | 2/2018 | Buer .................... H04W 56/001 |
| 2019/0364492 A1* | 11/2019 | Azizi ..................... H04W 4/024 |
| 2022/0264425 A1* | 8/2022 | Epstein .................... H04B 3/54 |
| 2025/0088224 A1* | 3/2025 | Dreiling ................. H04B 7/043 |

* cited by examiner

*Primary Examiner* — Peter J Iannuzzi
(74) *Attorney, Agent, or Firm* — Norton Rose Fulbright US LLP

(57) ABSTRACT

Systems and methods described herein may provide a system that enables game play or other application sessions from a set of candidate game hosts and environments to consumption devices of a user's choice while the user moves about their home between the different environments. The system may employ methods to determine where a user is located within the home, availability and selection of candidate game hosting and target environments, homing and direction of related I/O and audio-visual (AV) content for consumption. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device.

20 Claims, 11 Drawing Sheets

DYNAMIC NETWORK COVERAGE FOR MULTI-USER, MULTI-DEVICE EXPERIENCE

FIELD OF THE DISCLOSURE

The instant disclosure relates to information handling systems. More specifically, portions of this disclosure relate to execution of applications in a multi-room user environment.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

Information handling systems, such as a network hub, may execute applications such as gaming applications. Users of gaming devices connected to wireless networks may experience varying levels of network performance as a result of distance from the network hub or due to objects interfering with the network signal. Aspects of embodiments of this disclosure decrease wireless network instabilities, thereby improving the user experience of gaming applications executed over wireless networks.

In some embodiments, the aspects described herein may be used to support the execution of gaming applications in different environments. Gaming sessions may execute on a service, either locally on a device, on another system on the network, or in the cloud. A device may access the gaming session by executing an application that communicates with the service to receive and transmit user input to the service and provide feedback to the user from the service. The device may include its own audio/visual (AV) output for displaying a graphical user interface and/or a rendered display from the gaming session. Different environments at a location may include different AV systems, and the device may be automatically paired with an AV system and may be reconfigured to support interaction with an application session using the paired AV system.

A user's home is one example location that may have multiple environments, such as a living room, a dining room, a study, and/or a bedroom, each with different screen configurations, speaker configurations, and/or network availability. Aspects of embodiments disclosed herein may provide a system that enables game play from a set of candidate game hosts and environments to consumption devices of a user's choice while the user moves about their home between the different environments. The system may employ methods to determine where a user is located within the home, availability and selection of candidate game hosting and target environments, homing and direction of related I/O, and/or AV for consumption. The system then migrates the user and their information to the determined environment by coordinating gameplay by the user. The solution accommodates multiple users simultaneously within the home, whether in single player, multiplayer using the same screen, or multiplayer using separate screen games. The solution may configure AV and input/output (I/O) such that multiple users can consume one or multiple games in the home simultaneously, whether in separate locations or when seated together in front of the same consumption device, e.g., a large television, where multiple games might be hosted simultaneously.

The mobility of a user between services and applications for executing an application session may be supported by an information handling system that uses available telemetry from multiple sources to build a confidence-based knowledge graph of the user's gaming environments and determine a position of the user within that graph. A system with knowledge of devices in a user's gaming environment may build a knowledge graph by aggregating and comparing telemetry. For example, network telemetry may reveal that devices are positioned relatively near each other, a mobile device may reveal an absolute location based on GPS data, and/or an infrared presence sensor may reveal that the user is sitting in front a device. An intelligent system may assemble these individual pieces of telemetry into a broader knowledge graph based on the absolute and/or relative locations of the user's devices, the location of the user in relation, and or characteristics of the devices. This knowledge graph may be updated in real time and/or based on changes in device telemetry.

According to one embodiment, a method for execution by an information handling system, such as a hub device, includes receiving, by a hub, location information and network performance telemetry information from one or more controllers connected to the hub; generating, by the hub, a first mapping correlating usage of users of the one or more controllers with an environment around the hub based on the location information; generating, by the hub, a second mapping correlating the network performance telemetry information with the environment around the hub; determining, by the hub, first unstable zones based on the first mapping, the second mapping, and a first criteria; and determining, by the hub, an action based on the first unstable zones. The result may improve user experience through improving network performance to decrease latency in game play and decrease delays in establishing gaming sessions with different equipment in the users' environment.

In certain embodiments, the method described above may further comprise steering one or more frequency beams emitted by the hub toward the first unstable zones, strengthening the one or more frequency beams, or both. An information handling system configured according to the present embodiment may be functional to correct unstable zones of a wireless network.

The method may be embedded in a computer-readable medium as computer program code comprising instructions that cause a processor to perform operations corresponding to the steps of the method. In some embodiments, the processor may be part of an information handling system including a first network adaptor configured to transmit data over a first network connection; and a processor coupled to the first network adaptor, and the memory.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
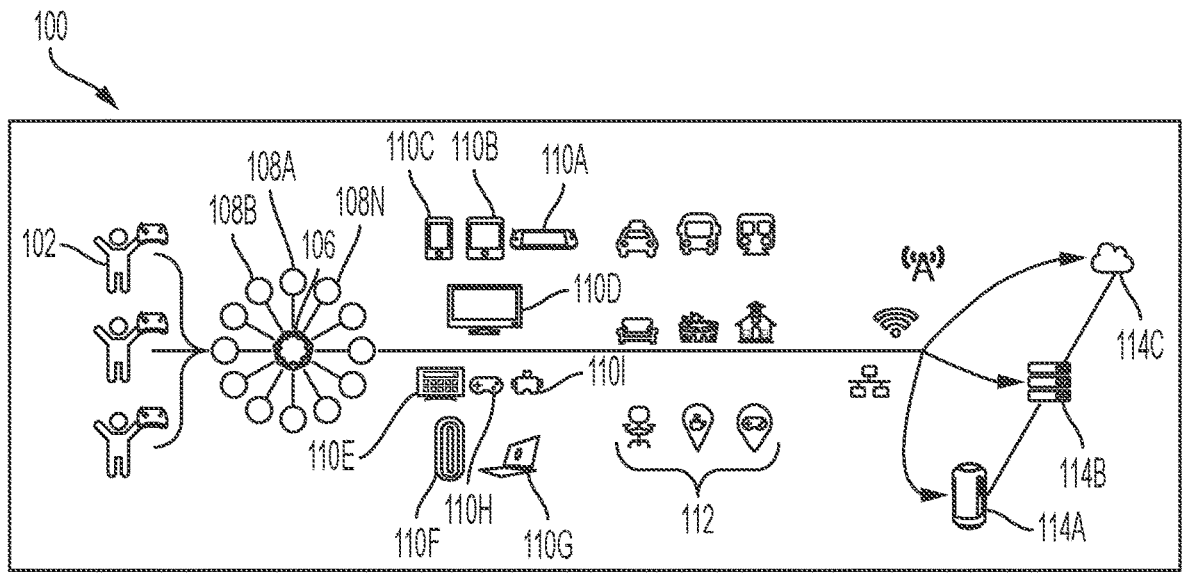
FIG. 1 is a block diagram illustrating aspects of a configurable system for providing services to users according to some embodiments of the disclosure.

These example embodiments describe and illustrate various aspects of a configurable and dynamic gaming environment that can be supported through the use of a hub device, which may be an information handling system. A hub device may be located in a user's home and used to arrange game play sessions (or more generically application sessions) between host devices and services. The host devices may execute an application for receiving an AV stream for displaying rendered content from a game play session (or other application session, such as executing on a hub), and in some configurations also receive user input for interacting with the session from a peripheral device, such as a gaming controller. The AV stream presented by the host device may be generated by a service. The service may execute on the hub device or another information handling system, such as a cloud computing resource. A home may include one or several host devices (e.g., televisions, mobile computers, tablet computers, and personal computers) and may include one or several information handling systems executing the service (e.g., a hub devices and personal computers).

The user's home may be divided into different environments defined by a space around a host device. For example, a living room with a television may be one environment and a bedroom with a personal computer may be another environment. A user may use a peripheral device in one of the environments and the hub device may configure a host device, a service, and the peripheral device for operation in the environment by determining the corresponding environment using a knowledge graph. The knowledge graph provides a database of historical information about the environments from which the hub device may use current characteristics of the peripheral device to deduce the location, and thus current environment, of the peripheral device. For example, the knowledge graph may include information about location of rooms (e.g., environments) in the house based on wireless signatures of devices within the different rooms. This difference in signatures reflects that a device on a one side of the house may receive beacon signals from different neighboring access points than a device on an opposite side of the house. When a user carries the peripheral device around the house, the hub device may determine a location of the peripheral device based on visible access points to the peripheral device. Other example characteristics beyond wireless signature for determining location are described in further detail below, and the knowledge graph may be used to combine different characteristics to identify the location, and thus environment, of the peripheral device.

Based on the location of the peripheral device determined from the knowledge graph, the hub device may initialize an application session for the peripheral device by determining an appropriate host device and service for the application session. For example, if the peripheral device is in the living room and is requesting a game that is within the capabilities of the service on the hub device to execute, the hub device may initialize an application session for the peripheral device between the television as a consumption device and the hub device as a service. The service on the hub device executes the game and streams rendered content to an application executing on the television consumption device.

The hub device may be used to migrate the peripheral device to a different environment and/or migrate the application session between host devices and/or services. For example, initially the application session may use a communication link between the peripheral device and the television host device for receiving user input, in which the application executing on the television host device relays user input to the service through a backhaul communication link from the television host device to the hub device. During the application session, the hub device may monitor characteristics of the peripheral device, including signal strength of connection to other components, and determine that the communication link from the peripheral device to the hub device is stronger than the peripheral device to the television host device. The hub device may migrate the peripheral device to a communications link with the hub device such that the service executing on the hub device directly receives the user input but the streaming session continues from the service to the application executing on the television host device. Such a change is illustrated in the change in configuration from FIG. 3A to the configuration of FIG. 3B described in further detail below.

Other aspects of the application session may also be migrated. For example, if the peripheral device is determined to move to a different environment, then the hub device may migrate the application session to an application executing on a host device within the new environment. As another example, if a connection between the television host device and the service becomes unstable, the hub device may recommend and/or initiate a migration of the application session to a different host device. One scenario for such a migration may be where the television host device is connected through a wireless link to the service in which the wireless link quality is reducing quality of the streaming and a second host device with a wired connection is available in a nearby environment. Each of these example migrations may be determined based on information in the knowledge graph regarding locations of environments and capabilities within those environments. As yet another example, a user may request execution of an application, such as a particular game, during the application session for which a better configuration exists than the current host device and/or current service. The request for a different application, such as a game requiring a certain GPU capability, may cause the hub device to determine that a second device executing a second service is better for hosting the application and migrate the peripheral device to the second service by, for example, reconfiguring network connections.

The hub device may support connecting to multiple peripheral devices. In one example, the hub device may support two peripheral devices using a shared session on one host device to play the same or different games on the host device. In another example, the hub device may support two peripheral devices in different environments using different sessions with different host devices. The hub device may determine the environment of each of the peripheral devices based on characteristics of the device and the knowledge graph and configure application session for each of the peripheral devices accordingly. Different arrangements of peripherals and players may be supported. For example, one hub device executing a service and one host device executing an application can support a configuration with Game A and one player (P1) with peripheral (C1) and Game B and one player (P2) with peripheral (C2); or can support a configuration with Game A and one player (P1) with peripheral (C1) and Game A and one player (P2) with peripheral (C2); or can support a configuration with Game A and two players (P1, P2) with peripherals (C1, C2).

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

FIG. 1 is a block diagram illustrating aspects of a configurable system for providing services to users according to some embodiments of the disclosure. A system 100 includes users 102 who may have access to a shared library of applications 106 including applications 108A-108N. The users 102 may have separate libraries, with some overlapping applications between the libraries. The users 102 may access the library 106 through devices 110A-I, such as mobile gaming device 110A, tablet computing device 110B, phone computing device 110C, television 110D, personal computing device 110E, desktop computing device 110F, laptop computing device 110G, game controller 110H, VR headset 110I. The devices 110 may access services at any of locations 112, including cars, busses, homes, hotels, offices, parks, etc. One or more of the devices 110 may communicate with an application session executing on a computing device 114, such as a home application hub 114A, a server 114B, or a cloud execution environment 114C. In some embodiments, environments may only exist for fixed devices, e.g., desktop computers, televisions, etc.

Figure 2:
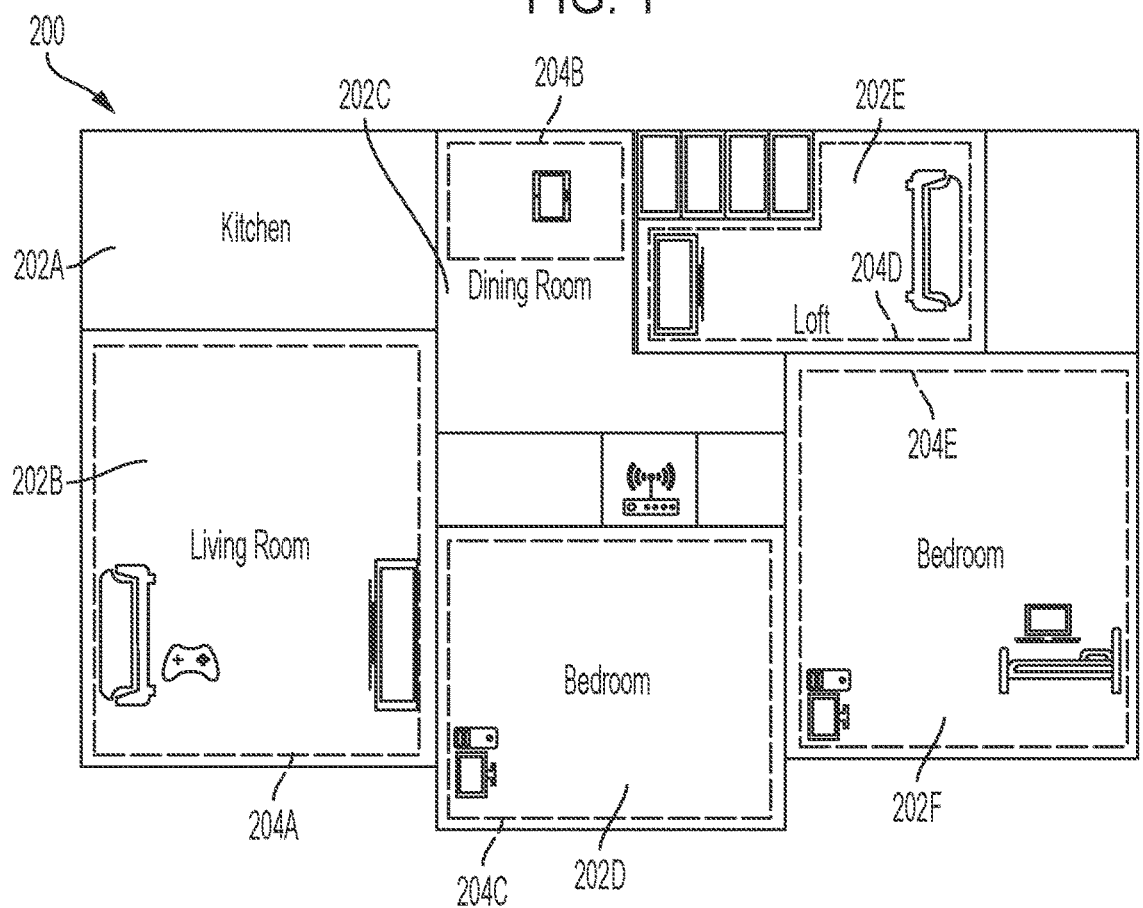
FIG. 2 is a block diagram illustrating possible game environments according to some embodiments of the disclosure.

FIG. 2 is a block diagram illustrating possible game environments according to some embodiments of the disclosure. A user's home 200 may include rooms 202A-F, and each of the rooms may have different information handling systems present, different AV equipment present, and/or different characteristics. For example, a living room 202B may include a large-size television, a bedroom 202D may include a personal computer, and a dining room 202C may include a table computing device. Gaming environments 204A-E in the home 200 may be defined based on spaces where a user is likely to execute an application session. Each gaming environment 204A-E may include numerous devices and gaming environments, devices that may or may not be capable of hosting games, and/or devices that may or may not be capable of receiving game output. A system 100 may allow multiple users in the home 200 to simultaneously execute an application session. In some embodiments, multiple games may be hosted on a single device. In some embodiments, multiple games may target a single output device. In some embodiments, solution manages where games should be hosted, where game output should go, and how to best route peripheral I/O for users.

A user may move between gaming environments 204A-E within the home 200 and continue an application session. For example, a user may take a device, such as a gaming controller, from environment 204A to environment 204C. The gaming controller may migrate and reconfigure for operation in environment 204C from a configuration for environment 204A. For example, the controller may transition from an application hosted on a TV in living room 202B to an application hosted on TV in dining room 202C while remaining connected to a host service executing on a PC in bedroom 202D.

Figure 3A:
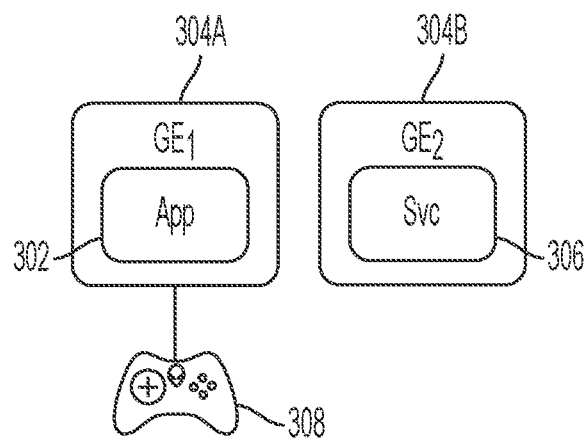
FIG. 3A is a block diagram illustrating application and services hosted in different gaming environments according to some embodiments of the disclosure.

Example configurations for applications and services in gaming environments are shown in FIGS. 3A-3D. FIG. 3A is a block diagram illustrating application and services hosted in different gaming environments according to some embodiments of the disclosure. In FIG. 3A, a first gaming environment 304A may include a device, such as a TV or PC, hosting an application 302, which is an endpoint for an application session such as a gaming session. The application 302 communicates with a service 306, which may be hosted on a device in a different gaming environment 304B. A controller 308 may communicate with the application 302 to receive user input for the application session to control, for example, a character in a game. In some embodiments, the controller 308 is connected to the environment 304A hosting the application and the I/O is configured to be relayed to the environment 304B hosting the actual game.

Figure 3B:
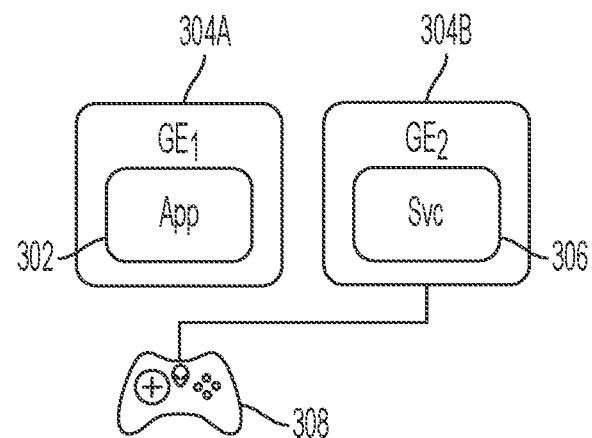
FIG. 3B is a block diagram illustrating application and services hosted in different gaming environments according to some embodiments of the disclosure.

Another arrangement for the application and service is shown in FIG. 3B. FIG. 3B is a block diagram illustrating application and services hosted in different gaming environments according to some embodiments of the disclosure. In FIG. 3B, the controller 308 communicates with the service 306 for providing user input to an application session, with the AV rendering target of the application session being application 302 in a different gaming environment.

Figure 3C:
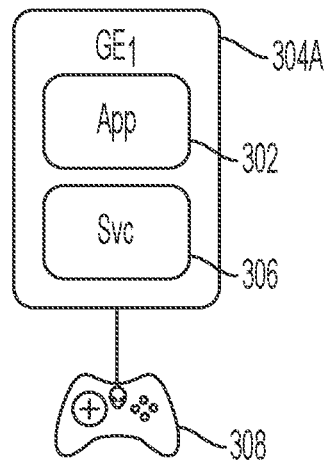
FIG. 3C is a block diagram illustrating application and service hosted in a common gaming environment according to some embodiments of the disclosure.

Another arrangement for the application and service is shown in FIG. 3C. FIG. 3C is a block diagram illustrating application and service hosted in a common gaming environment according to some embodiments of the disclosure. In FIG. 3C, the application 302 and the service 306 are executed in the same gaming environment 304A, which may be a single device, two devices, or a combination of devices in the gaming environment 304A. The controller 308 may communicate with either the service 306 and/or the application 302.

Figure 3D:
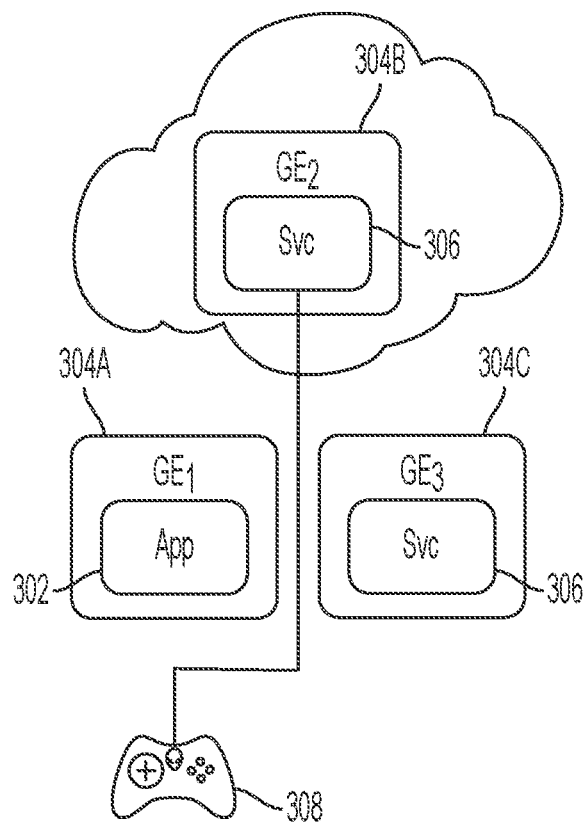
FIG. 3D is a block diagram illustrating a cloud-based service arrangement for a gaming environment according to some embodiments of the disclosure.

A further arrangement for the application and service is shown in FIG. 3D. FIG. 3D is a block diagram illustrating a cloud-based service arrangement for a gaming environment according to some embodiments of the disclosure. In FIG. 3D, the controller 308 may communicate with a service 306 hosted in a gaming environment 304B that is remote from the gaming environment 304A in which the application 302 is executing. The service 306 may be executing, for example, on a remote device, such as when the user's home includes the gaming environment 304B but the user is engaging with application 302 at a location on a different network from their home (e.g., at a friend's house). The service 306 may also or alternatively be executed, for example, on a cloud computing device available as a subscription service to the user.

Figure 4:
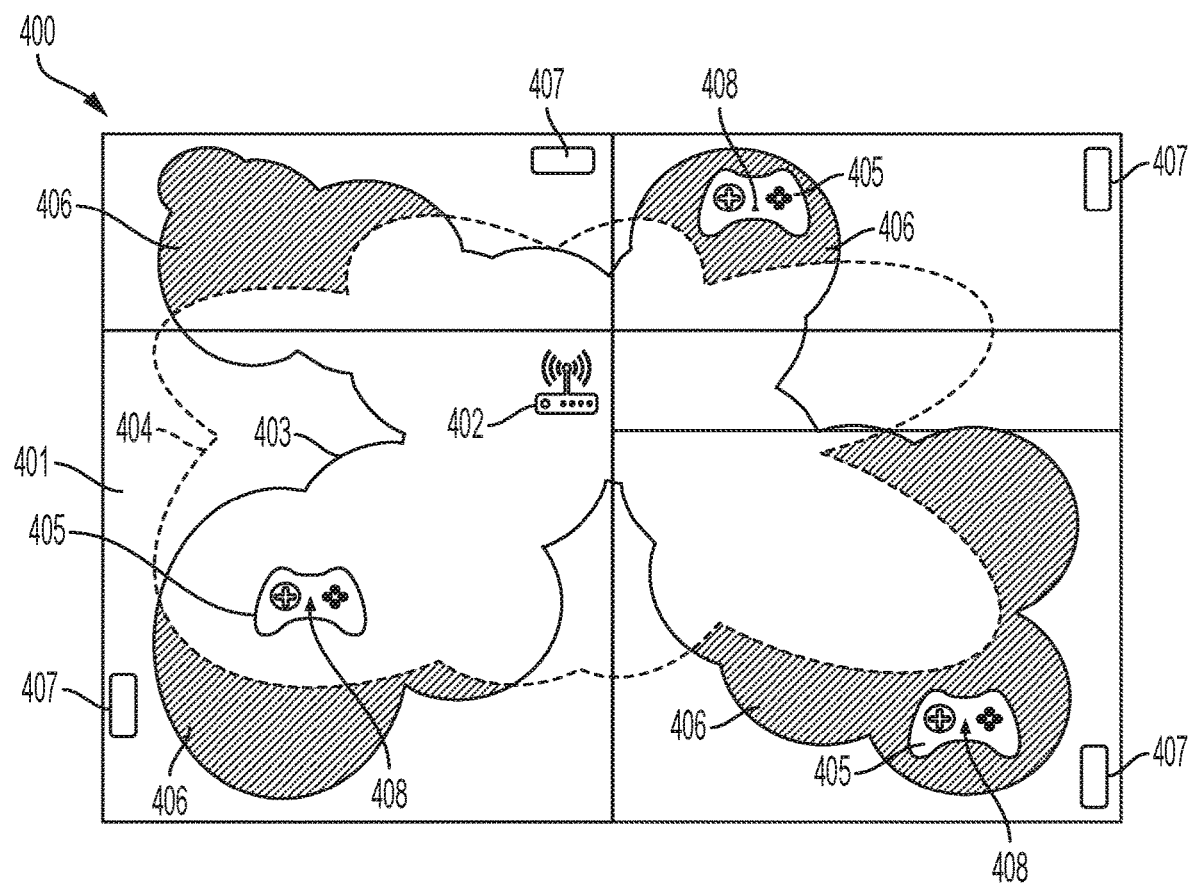
FIG. 4 is a diagram illustrating a system for optimizing the performance of wireless networks.

FIG. 4 is a diagram illustrating a possible system for optimizing performance of the embodiments of wireless networks described above. In certain embodiments, system 400 may be implemented to improve a wireless network located in gaming environment 401. System 400 may include a hub 402 and one or more controllers 405 wirelessly connected to hub 402. As users roam around gaming environment 401 while using controllers 405, hub 402 may capture usage data on each controller 405 and then generate a usage mapping 403 by correlating the captured usage data with location information describing gaming environment 401. Hub 402 may then capture network performance telemetry information from each controller 405 and then generate a network performance mapping 404 by correlating the captured network performance telemetry information with the location information describing gaming environment 401. Hub 402 may then overlay usage mapping 403 on network performance mapping 404 to identify unstable zones 406.

Unstable zones 406 are areas of gaming environment 401 where a high usage density of a controller 405 coincides with a poor network performance distribution. In some embodiments, high usage density may be defined by a static usage threshold. In other embodiments, high usage density may be determined dynamically by comparing relatively higher usage densities in some areas of gaming environment 401 to relatively lower usage densities in other areas of gaming environment 401. In some embodiments, poor network performance distribution may be defined in terms of network performance parameters such as latency, packet loss, jitter, bandwidth, or a combination thereof. In some embodiments, poor network performance distribution may be defined by a static threshold for these network performance parameters. In other embodiments, poor network performance distribution may be determined dynamically by comparing relatively better network performance parameter values in some areas of gaming environment 401 to relatively worse performance parameter values in other areas of gaming environment 401.

In certain embodiments, hub 402 may receive location information in the form of ultra-wideband ("UWB") positioning information for each of the controllers 405. In such an embodiment, the wireless network supporting gaming environment 401 may be implemented as a UWB infrastructure wherein one or more locations in gaming environment 401 feature a UWB tag 407 and the controllers 405 feature UWB anchors 408. A UWB anchor 408 may recognize when a controller 405 is proximal to a UWB tag 407 and, in response, may send positioning information to hub 402 recording that the controller 405 is in use in the location corresponding to the proximal UWB tag 407.

In some embodiments, hub 402 may be configured to emit frequency beams comprising the wireless network serving gaming environment 401. In other embodiments, hub 402 may be coupled to a separate apparatus configured to emit frequency beams comprising the wireless network serving gaming environment 401. Hub 402 may be physically coupled to the separate apparatus, communicatively coupled, or both.

Figure 5:
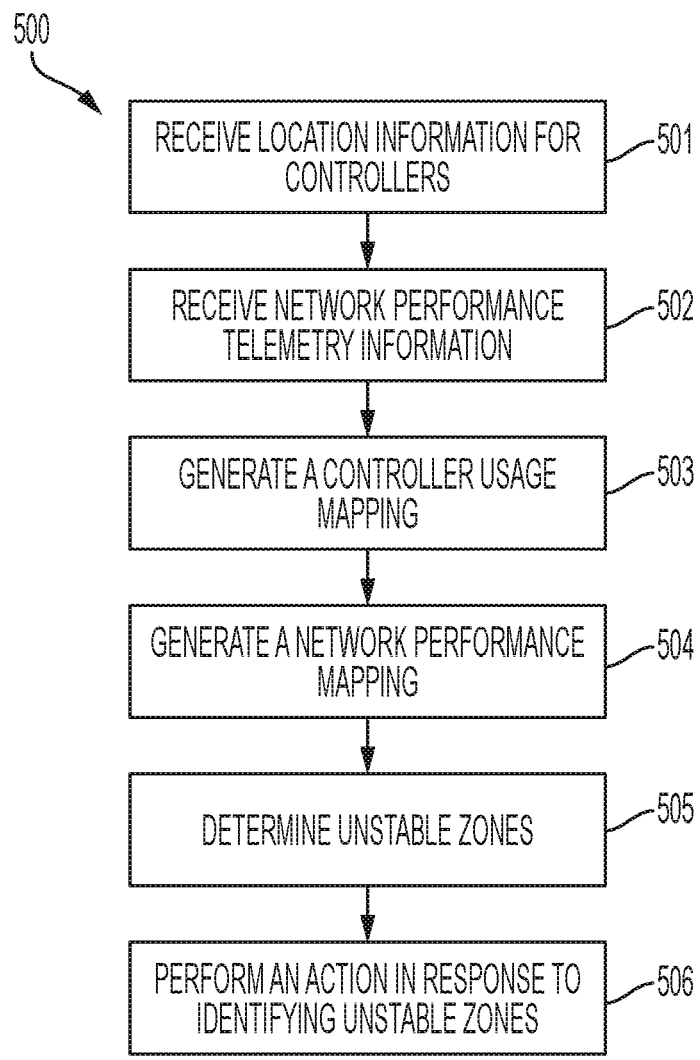
FIG. 5 is an operational flow diagram illustrating a method for implementing a system for optimizing performance of wireless networks.

FIG. 5 is an exemplary operational flow diagram illustrating a possible method 500 for implementing a system for optimizing performance of wireless networks such as the embodiments for such a system described above. In in the example of FIG. 5, system 400 works as follows: as users use each controller 405, hub 402 receives location information describing the areas of gaming environment 401 where each controller 405 is being used, as noted in block 501. Block 501 may include assembling individual user roaming maps and composite user roaming maps from other users with gaming controllers coupled to the hub. In some embodiments, the mapping may be a binary map indicating preferred usage and low usage areas. In some embodiments, the mapping may have various levels corresponding to different levels of usage (e.g., a first level indicating high usage, a second level indicating a medium usage, and a third level indicating a low usage, and a fourth level indicating no usage). When various levels of usage are determined they may be used in prioritizing the removal of certain unstable zones. In block 502, hub 402 receives network performance telemetry information from each controller 405 being used regarding the area of gaming environment 401 where that controller 405 is being used. In some embodiments, hub 402 may execute block 501 before executing block 502, after executing block 502, or simultaneously with executing block 502. In block 503, hub 402 generates a usage mapping 403 for each controller 405 by correlating the usage of that controller 405 with the location information received by that controller 405. In block 504, hub 402 generates a network performance mapping 404 by correlating network performance telemetry information received from each controller 405 with the location information describing gaming environment 401. In some embodiments, hub 402 may execute block 503 before executing block 504, after executing block 504, or simultaneously with executing block 504. In block 505, hub 402 determines the location of unstable zones 406 by comparing the usage mapping 403 with the network performance mapping 404 and applying criteria for defining high usage density and poor network performance distribution. In block 406, hub 402 performs an action in response to identifying unstable zones 406.

In some embodiments, hub 402 may generate a plurality of usage mappings 403 when executing block 503, one mapping for each controller 405 in use. In certain embodiments, hub 402 may generate each usage mapping 403 sequentially. In other embodiments, hub 402 may generate all usage mappings 403 simultaneously. When hub 402 generates a plurality of usage mappings 403 during block 503, hub 402 may then compare each of those usage mappings 403 to network performance mapping 404 to determine unstable zones 406 relating to each particular controller 405 in use when executing block 505. In certain embodiments, hub 402 may determine unstable zones 406 corresponding to each usage mapping 403 sequentially. In other embodiments, hub 402 may determine unstable zones 406 corresponding to each usage mapping 403 simultaneously. When hub 402 identifies unstable zones 406 relating to each particular controller 405 in use during block 505, hub 402 may then perform an action responsive to any or all of the unstable zones 406 identified particular to each controller 405 in use when executing block 506. In certain embodiments, hub 402 may perform actions responsive to the unstable zones 406 particular to each controller 405 sequentially. In other embodiments, hub 402 may perform actions responsive to the unstable zones 406 particular to each controller 405 simultaneously.

Figure 6A:
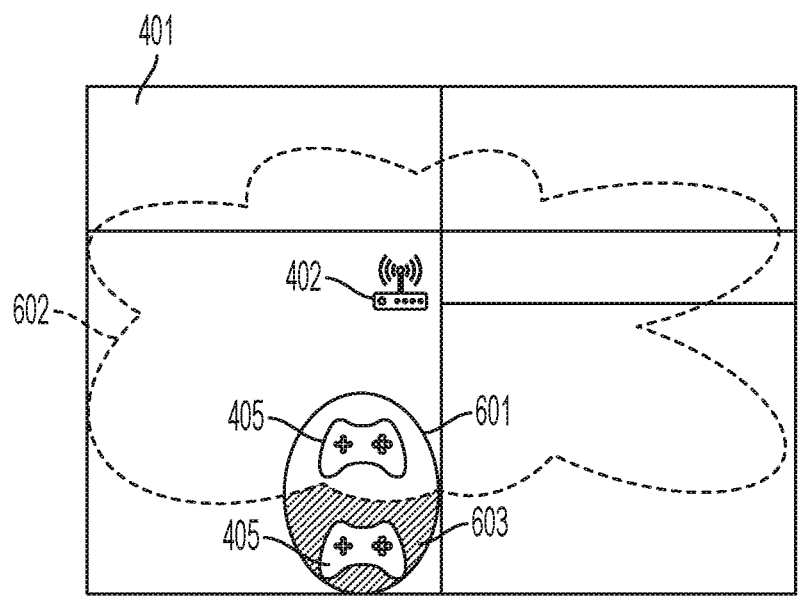
FIG. 6A is a diagram illustrating a system configurable to notify the user to reorient a network hub so as to eliminate unstable zones in a wireless network according to some embodiments of the disclosure.
Figure 6B:
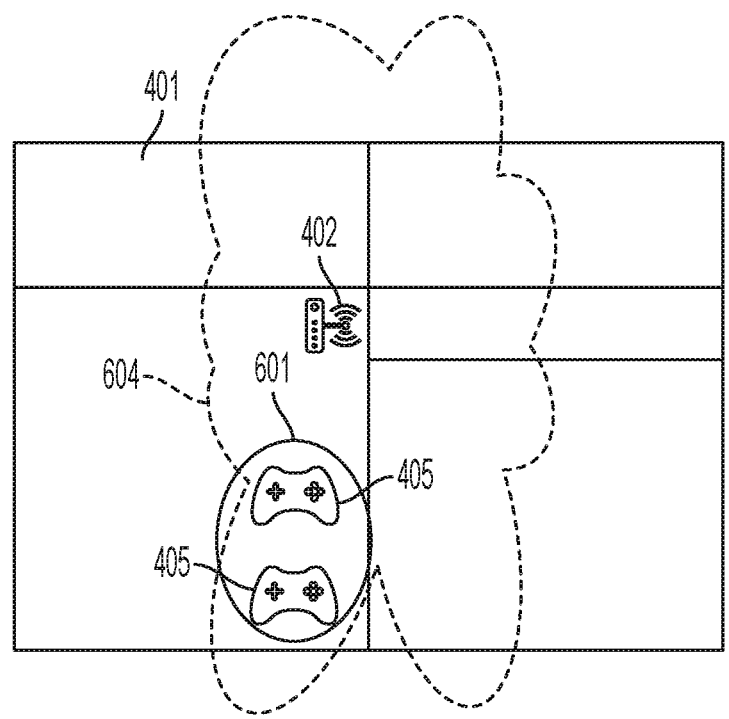
FIG. 6B is a diagram illustrating a system configurable to notify the user to reorient a network hub so as to eliminate unstable zones in a wireless network according to some embodiments of the disclosure.

FIGS. 6A-6B illustrate an embodiment of system 400 wherein the actions that hub 402 performs when executing block 506 comprise presenting the user with a notification to reorient hub 402 to correct identified unstable zones. As shown in FIG. 6A, in the present embodiment, the implementation of method 500 by system 400 results in a usage mapping 601, a network performance mapping 602, and a corresponding unstable zone 603. Hub 402 may then present the user with a notification to reorient hub 402. The notification may indicate simply to reorient. The notification may include information about how to reorient the hub, such as two turn the hub 90 degrees in the plane of the floor. The notification may be generated and presented through a combination of, for example, one or more of a text message, a push notification, an e-mail message, a display on the hub device, and/or a message presented on one or more of the AV equipment in the environment. In this embodiment, by reorienting hub 402, the user consequently reorients the frequency beams comprising the wireless network serving gaming environment 401, thereby reorienting the distribution of the wireless network across gaming environment 401. As shown in FIG. 6B, after the user reorients the distribution of the wireless network, hub 402 may generate an updated network performance mapping 604 reflecting the reoriented distribution of the wireless network. Updated network performance mapping 604 may better align with usage mapping 601 than network performance mapping 602 did, thereby eliminating unstable zone 603.

Figure 7A:
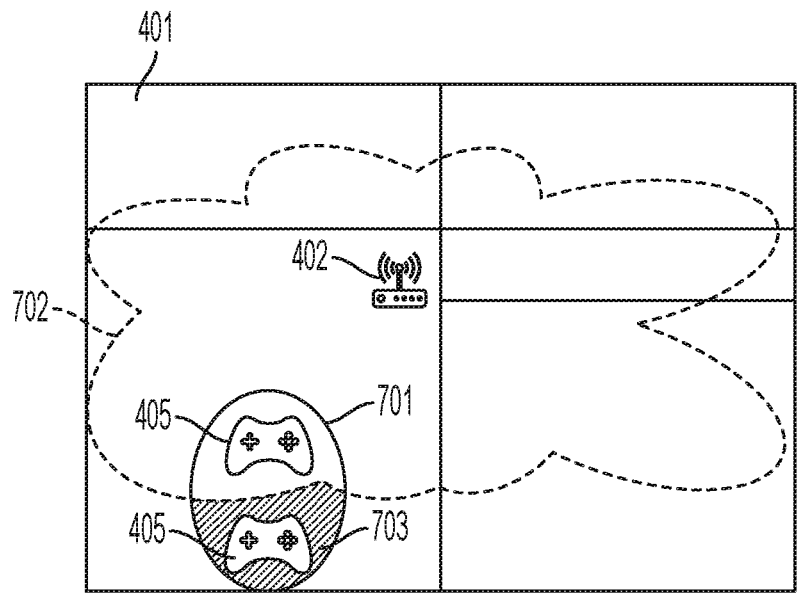
FIG. 7A is a diagram illustrating a system configurable to modify the distribution of a wireless network so as to eliminate unstable zones in the network according to some embodiments of the disclosure.
Figure 7B:
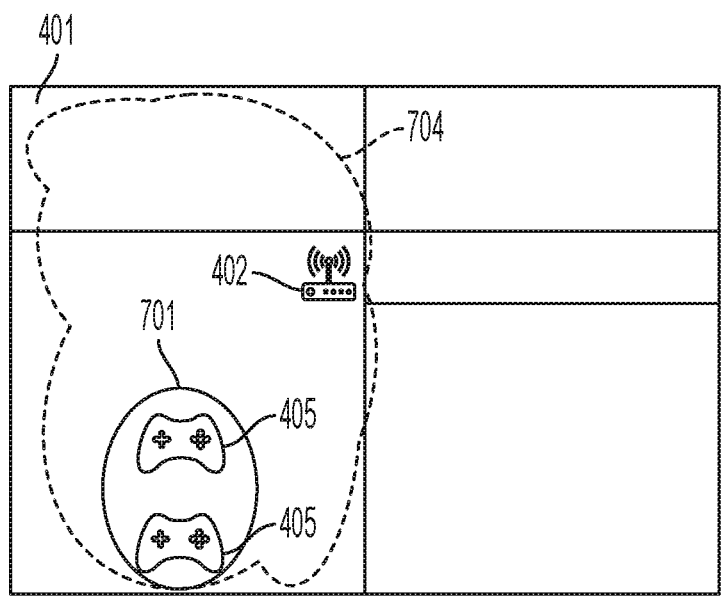
FIG. 7B is a diagram illustrating a system configurable to modify the distribution of a wireless network so as to eliminate unstable zones in the network according to some embodiments of the disclosure.

FIGS. 7A-7B illustrate another embodiment of system 400 wherein the actions that hub 402 performs when executing block 506 comprise modifying the distribution of the wireless network serving gaming environment 401 so as to correct unstable zones. As shown in FIG. 7A, in the present embodiment, the implementation of method 500 by system 400 results in a usage mapping 701, a network performance mapping 702, and a corresponding unstable zone 703. Hub 402 may then modify the distribution of the wireless network serving gaming environment 401 so as to eliminate unstable zone 703. Hub 402 may modify the distribution of the wireless network by causing the frequency beams comprising the wireless network to be steered toward unstable zone 703, by causing the frequency beams already directed toward unstable zone 703 to be strengthened, or both. As shown in FIG. 7B, after hub 402 modifies the distribution of the wireless network, hub 402 may generate an updated network performance mapping 704 reflecting the modified distribution of the wireless network. Updated network performance mapping 704 may better align with usage mapping 701 than network performance mapping 702 did, thereby eliminating unstable zone 703.

Figure 8A:
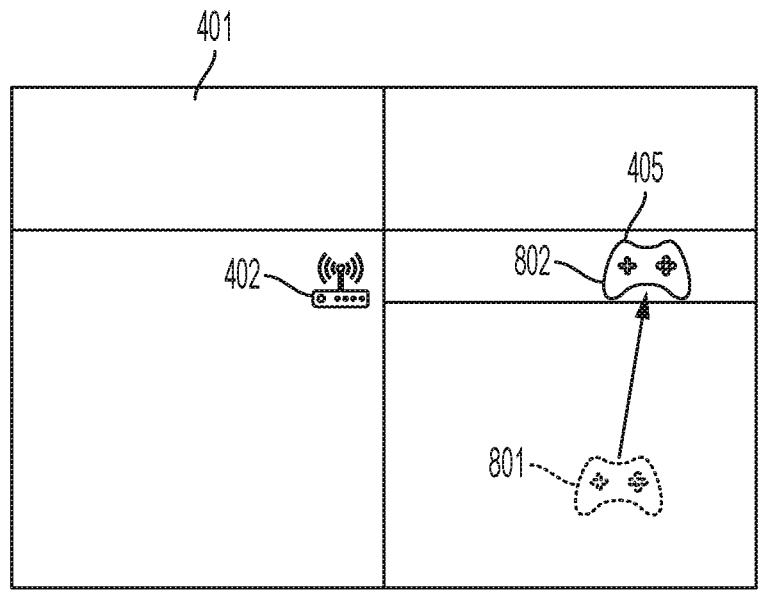
FIG. 8A is a diagram illustrating a system configurable to dynamically modify the distribution of a wireless network so as to eliminate unstable zones in the network according to some embodiments of the disclosure.
Figure 8B:
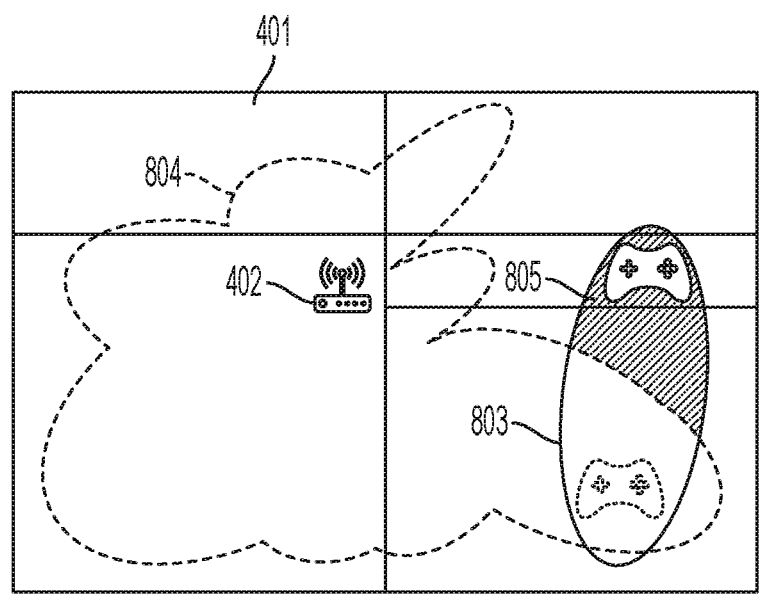
FIG. 8B is a diagram illustrating a system configurable to dynamically modify the distribution of a wireless network so as to eliminate unstable zones in the network according to some embodiments of the disclosure.
Figure 8C:
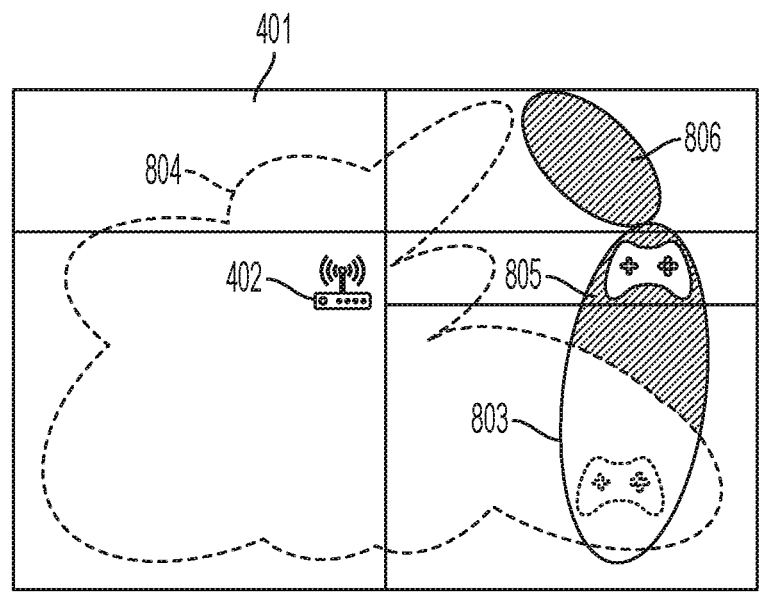
FIG. 8C is a diagram illustrating a system configurable to dynamically modify the distribution of a wireless network so as to eliminate unstable zones in the network according to some embodiments of the disclosure.
Figure 8D:
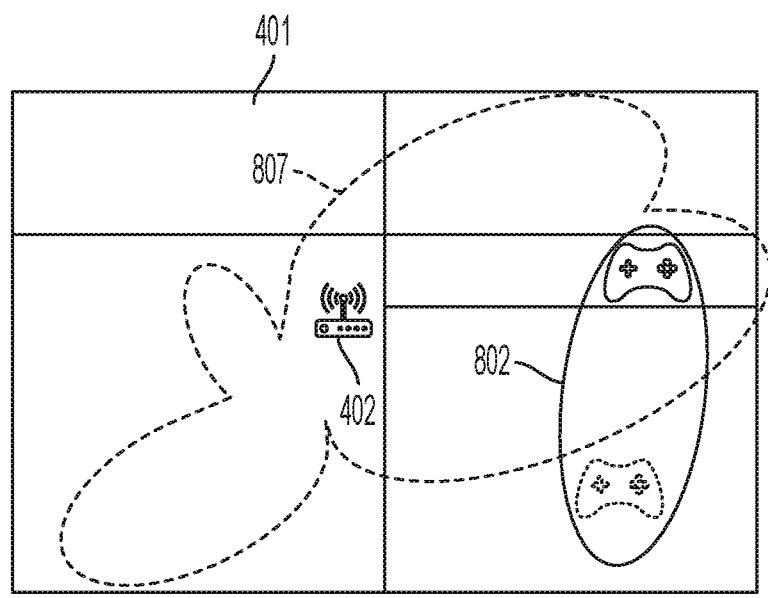
FIG. 8D is a diagram illustrating a system configurable to dynamically modify the distribution of a wireless network so as to eliminate unstable zones in the network according to some embodiments of the disclosure.
Figure 8E:
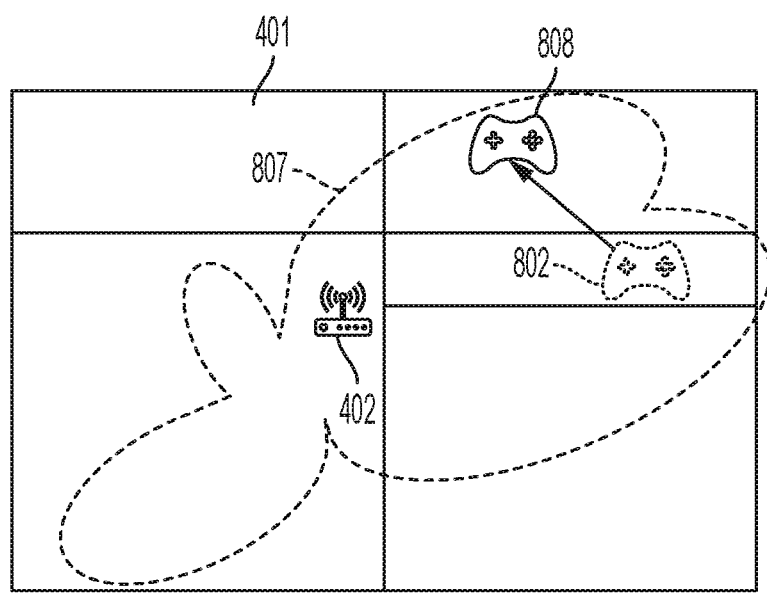
FIG. 8E is a diagram illustrating a system configurable to dynamically modify the distribution of a wireless network so as to eliminate unstable zones in the network according to some embodiments of the disclosure.

FIGS. 8A-8E illustrate another embodiment of system 400 wherein the actions that hub 402 performs when executing block 506 comprise dynamically modifying the distribution of the wireless network serving gaming environment 401 so as to predict and preemptively correct unstable zones before they effect a user's experience. As shown in FIG. 8A, in the present embodiment, a user moves through gaming environment 401 while using controller 405, first using controller 405 at a first position 801, then proceeding to use controller 405 at second position 802 located in a different area of gaming environment 401. As shown in FIG. 8B, the implementation of method 500 by system 400 results in a usage mapping 803, a network performance mapping 804, and a corresponding unstable zone 805. As shown in FIG. 8C, hub 402 may then predict a future unstable zone 806 at a location where the user may attempt to use the controller next. As shown in FIG. 8D, hub 402 may then modify the distribution of the wireless network serving gaming environment 401 so as to both eliminate unstable zone 805 and also preemptively eliminate future unstable zone 806. Hub 402 may modify the distribution of the wireless network by causing the frequency beams comprising the wireless network to be steered toward unstable zone 805 and future unstable zone 806, by causing the frequency beams already directed toward unstable zone 805 and future unstable 806 to be strengthened, or by any combination thereof. In some embodiments, hub 402 may be configurable to determine whether to modify the wireless network so as to eliminate only future unstable zone 806, only unstable zone 805, or both according to the needs of the user in light of the network resources (e.g., bandwidth) available. After hub 402 modifies the distribution of the wireless network, hub 402 may generate an updated network performance mapping 807 reflecting the modified distribution of the wireless network, as shown in FIG. 8D. As a result of hub 402 modifying the wireless network so as to eliminate future unstable zone 806, the user may proceed to use controller 405 at a third position 808 without experiencing any disruption in experience due to future unstable zone 806, as shown in FIG. 8E.

In certain embodiments, hub 402 may be configured to predict future unstable zones using an artificial intelligence ("AI") algorithm implemented through one or more machine learning models. Machine learning models, as described herein, may include logistic regression techniques, linear discriminant analysis, linear regression analysis, artificial neural networks, machine learning classifier algorithms, or classification/regression trees in some embodiments. In various other embodiments, machine learning systems may employ Naive Bayes predictive modeling analysis of several varieties, learning vector quantization artificial neural network algorithms, or implementation of boosting algorithms such as Adaboost or stochastic gradient boosting systems for iteratively updating weighting to train a machine learning classifier to determine a relationship between an influencing attribute, such as received device data, and a system, such as an environment or particular user, and/or a degree to which such an influencing attribute affects the outcome of such a system or determination of environment. An AI algorithm for predicting future unstable zones may be configured to consider influencing attributes such as a current usage mapping relating to a particular controller, current usage mappings relating to a plurality of controllers, prior usage mappings relating to either a particular controller or a plurality of controllers, currently determined unstable zones, prior determined unstable zones, or any combination thereof.

In some embodiments, hub 402 may be configured to determine whether to modify the wireless network so as to eliminate only future unstable zones, only current unstable zone, or both using an AI algorithm implemented through one or more machine learning models. An AI algorithm for determining which unstable zones to eliminate may be configured to consider influencing attributes such as a current usage mapping relating to a particular controller, current usage mappings relating to a plurality of controllers, prior usage mappings relating to either a particular controller or a plurality of controllers, currently determined unstable zones, prior determined unstable zones, network resources (e.g., bandwidth) available, or any combination thereof.

Figure 9:
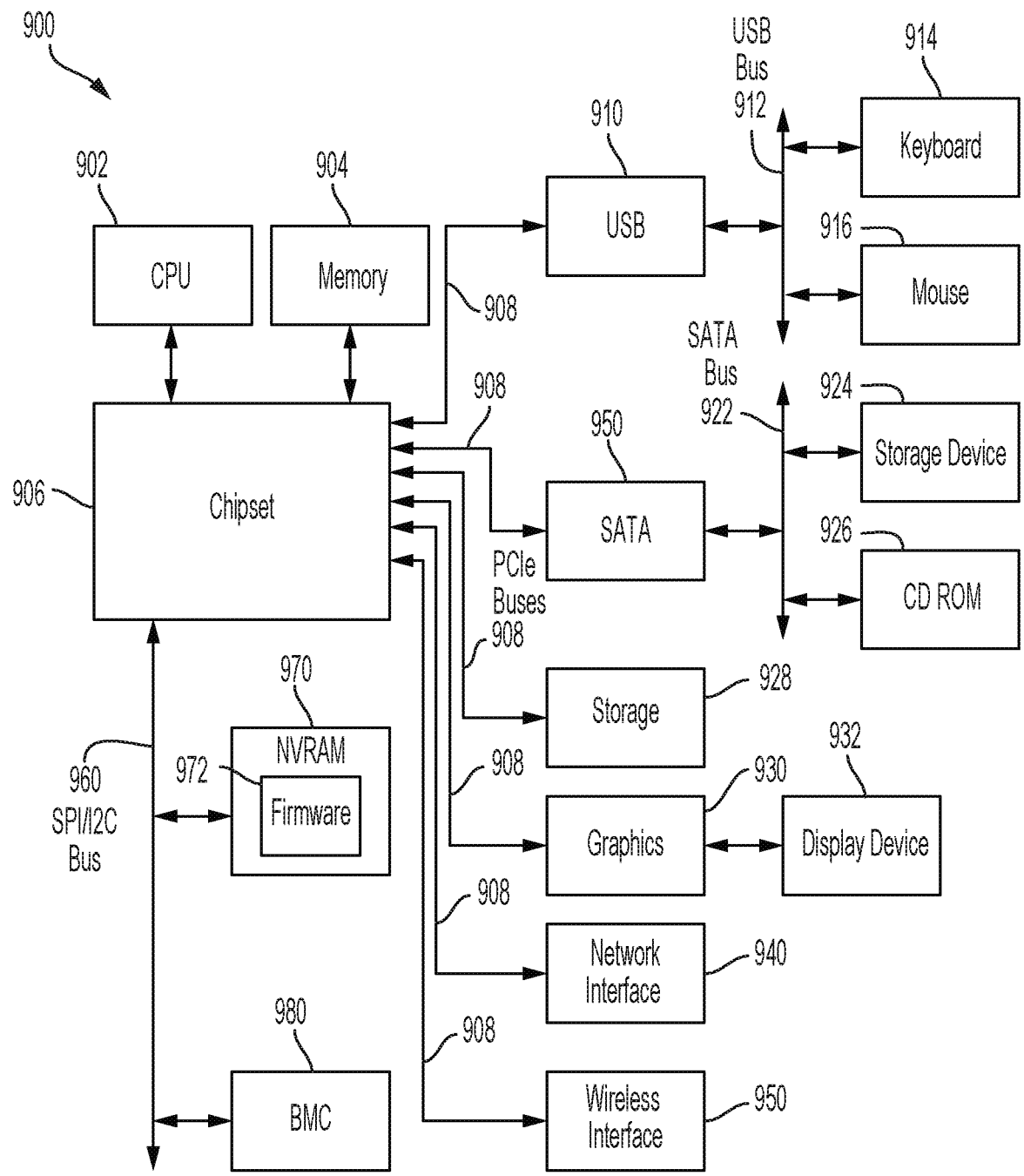
FIG. 9 is a schematic block diagram of an example information handling system according to some embodiments of the disclosure.

FIG. 9 illustrates an example information handling system 900, which may be one embodiment for the hub 402. Information handling system 900 may include a processor 902 (e.g., a central processing unit (CPU)), a memory (e.g., a dynamic random-access memory (DRAM)) 904, and a chipset 906. In some embodiments, one or more of the processor 902, the memory 904, and the chipset 906 may be included on a motherboard (also referred to as a mainboard), which is a printed circuit board (PCB) with embedded conductors organized as transmission lines between the processor 902, the memory 904, the chipset 906, and/or other components of the information handling system. The components may be coupled to the motherboard through packaging connections such as a pin grid array (PGA), ball grid array (BGA), land grid array (LGA), surface-mount technology, and/or through-hole technology. In some embodiments, one or more of the processor 902, the memory 904, the chipset 906, and/or other components may be organized as a System on Chip (SoC).

The processor 902 may execute program code by accessing instructions loaded into memory 904 from a storage device, executing the instructions to operate on data also loaded into memory 904 from a storage device, and generate output data that is stored back into memory 904 or sent to another component. The processor 902 may include processing cores capable of implementing any of a variety of instruction set architectures (ISAs), such as the x86, POWERPC®, ARM®, SPARC®, or MIPS® ISAs, or any other suitable ISA. In multi-processor systems, each of the processors 902 may commonly, but not necessarily, implement the same ISA. In some embodiments, multiple processors may each have different configurations such as when multiple processors are present in a big-little hybrid configuration with some high-performance processing cores and some high-efficiency processing cores. The chipset 906 may facilitate the transfer of data between the processor 902, the memory 904, and other components. In some embodiments, chipset 906 may include two or more integrated circuits (ICs), such as a northbridge controller coupled to the processor 902, the memory 904, and a southbridge controller, with the southbridge controller coupled to the other components such as USB 910, SATA 920, and PCIe buses 908. The chipset 906 may couple to other components through one or more PCIe buses 908.

Some components may be coupled to one bus line of the PCIe buses 908, whereas some components may be coupled to more than one bus line of the PCIe buses 908. One example component is a universal serial bus (USB) controller 910, which interfaces the chipset 906 to a USB bus 912. A USB bus 912 may couple input/output components such as a keyboard 914 and a mouse 916, but also other components such as USB flash drives, or another information handling system. Another example component is a SATA bus controller 920, which couples the chipset 906 to a SATA bus 922. The SATA bus 922 may facilitate efficient transfer of data between the chipset 906 and components coupled to the chipset 906 and a storage device 924 (e.g., a hard disk drive (HDD) or solid-state disk drive (SDD)) and/or a compact disc read-only memory (CD-ROM) 926. The PCIe bus 908 may also couple the chipset 906 directly to a storage device 928 (e.g., a solid-state disk drive (SDD)). A further example of an example component is a graphics device 930 (e.g., a graphics processing unit (GPU)) for generating output to a display device 932, a network interface controller (NIC) 940, and/or a wireless interface 950 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces).

The chipset 906 may also be coupled to a serial peripheral interface (SPI) and/or Inter-Integrated Circuit (I2C) bus 960, which couples the chipset 906 to system management components. For example, a non-volatile random-access memory (NVRAM) 970 for storing firmware 972 may be coupled to the bus 960. As another example, a controller, such as a baseboard management controller (BMC) 980, may be coupled to the chipset 906 through the bus 960. BMC 980 may be referred to as a service processor or embedded controller (EC). Capabilities and functions provided by BMC 980 may vary considerably based on the type of information handling system. For example, the term baseboard management system may be used to describe an embedded processor included at a server, while an embedded controller may be found in a consumer-level device. As disclosed herein, BMC 980 represents a processing device different from processor 902, which provides various management functions for information handling system 900. For example, an embedded controller may be responsible for power management, cooling management, and the like. An embedded controller included at a data storage system may be referred to as a storage enclosure processor or a chassis processor.

System 900 may include additional processors that are configured to provide localized or specific control functions, such as a battery management controller. Bus 960 can include one or more busses, including a Serial Peripheral Interface (SPI) bus, an Inter-Integrated Circuit (I2C) bus, a system management bus (SMBUS), a power management bus (PMBUS), or the like. BMC 980 may be configured to provide out-of-band access to devices at information handling system 900. Out-of-band access in the context of the bus 960 may refer to operations performed prior to execution of firmware 972 by processor 902 to initialize operation of system 900.

Firmware 972 may include instructions executable by processor 902 to initialize and test the hardware components of system 900. For example, the instructions may cause the processor 902 to execute a power-on self-test (POST). The instructions may further cause the processor 902 to load a boot loader or an operating system (OS) from a mass storage device. Firmware 972 additionally may provide an abstraction layer for the hardware, such as a consistent way for application programs and operating systems to interact with the keyboard, display, and other input/output devices. When power is first applied to information handling system 900, the system may begin a sequence of initialization procedures, such as a boot procedure or a secure boot procedure. During the initialization sequence, also referred to as a boot sequence, components of system 900 may be configured and enabled for operation and device drivers may be installed. Device drivers may provide an interface through which other components of the system 900 can communicate with a corresponding device. The firmware 972 may include a basic input-output system (BIOS) and/or include a unified extensible firmware interface (UEFI). Firmware 972 may also include one or more firmware modules of the information handling system. Additionally, configuration settings for the firmware 972 and firmware of the information handling system 900 may be stored in the NVRAM 970. NVRAM 970 may, for example, be a non-volatile firmware memory of the information handling system 900 and may store a firmware memory map namespace of the information handling system. NVRAM 970 may further store one or more container-specific firmware memory map namespaces for one or more containers concurrently executed by the information handling system.

Information handling system 900 may include additional components and additional busses, not shown for clarity. For example, system 900 may include multiple processor cores (either within processor 902 or separately coupled to the chipset 906 or through the PCIe buses 908), audio devices (such as may be coupled to the chipset 906 through one of the PCIe busses 908), or the like. While a particular arrangement of bus technologies and interconnections is illustrated for the purpose of example, one of skill will appreciate that the techniques disclosed herein are applicable to other system architectures. System 900 may include multiple processors and/or redundant bus controllers. In some embodiments, one or more components may be integrated together in an integrated circuit (IC), which is circuitry built on a common substrate. For example, portions of chipset 906 can be integrated within processor 902. Additional components of information handling system 900 may include one or more storage devices that may store machine-executable code, one or more communications ports for communicating with external devices, and various input and output (I/O) devices, such as a keyboard, a mouse, and a video display.

In some embodiments, processor 902 may include multiple processors, such as multiple processing cores for parallel processing by the information handling system 900. For example, the information handling system 900 may include a server comprising multiple processors for parallel processing. In some embodiments, the information handling system 900 may support virtual machine (VM) operation, with multiple virtualized instances of one or more operating systems executed in parallel by the information handling system 900. For example, resources, such as processors or processing cores of the information handling system may be assigned to multiple containerized instances of one or more operating systems of the information handling system 900 executed in parallel. A container may, for example, be a virtual machine executed by the information handling system 900 for execution of an instance of an operating system by the information handling system 900. Thus, for example, multiple users may remotely connect to the information handling system 900, such as in a cloud computing configuration, to utilize resources of the information handling system 900, such as memory, processors, and other hardware, firmware, and software capabilities of the information handling system 900. Parallel execution of multiple containers by the information handling system 900 may allow the information handling system 900 to execute tasks for multiple users in parallel secure virtual environments.

The schematic or flow chart diagrams of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
  receiving, by a hub, location information and network performance telemetry information from one or more controllers connected to the hub;
  generating, by the hub, a first mapping correlating usage of users of the one or more controllers with an environment around the hub based on the location information;
  generating, by the hub, a second mapping correlating the network performance telemetry information with the environment around the hub;
  determining, by the hub, first unstable zones based on the first mapping, the second mapping, and a first criteria; and
  determining, by the hub, an action based on the first unstable zones.

2. The method of claim 1, wherein the location information comprises ultra-wideband positioning information of the one or more controllers.

3. The method of claim 1, wherein the action comprises generating a notification to reorient the hub based on the first unstable zones.

4. The method of claim 1, wherein the action comprises steering one or more frequency beams emitted by the hub toward the first unstable zones, strengthening the one or more frequency beams, or both.

5. The method of claim 1, wherein the action comprises:
  predicting, by an artificial intelligence algorithm, one or more future unstable zones based on the first unstable zones and the first mapping; and
  steering one or more frequency beams emitted by the hub toward the future unstable zones, strengthening the one or more frequency beams, or both.

6. The method of claim 1, further comprising determining, by the hub, second unstable zones based on the first mapping, the second mapping, and a second criteria.

7. The method of claim 1, wherein the network performance telemetry information comprises at least one of latency, packet loss, jitter, and bandwidth.

8. The method of claim 1, wherein the first mapping comprises a plurality of mappings, each of the plurality of mappings correlating usage of a particular user of the one or more controllers with the environment around the hub based on the location information.

9. A system, comprising:
a hub configured to:
- receive location information and network performance telemetry information from one or more controllers connected to the hub;
- generate a first mapping correlating usage of users of the one or more controllers with an environment around the hub based on the location information;
- generate a second mapping correlating the network performance telemetry information with the environment around the hub;
- determine first unstable zones based on the first mapping, the second mapping, and a first criteria; and
- determine an action based on the first unstable zones.

10. The system of claim 9, wherein the location information comprises ultra-wideband positioning information of the one or more controllers.

11. The system of claim 9, wherein the action comprises generating a notification to reorient the hub based on the first unstable zones.

12. The system of claim 9, wherein the action comprises steering one or more frequency beams emitted by the hub toward the first unstable zones, strengthening the one or more frequency beams, or both.

13. The system of claim 9, wherein the action comprises:
- predicting, by an artificial intelligence algorithm, one or more future unstable zones based on the first unstable zones and the first mapping; and
- steering one or more frequency beams emitted by the hub toward the future unstable zones, strengthening the one or more frequency beams, or both.

14. The system of claim 9, wherein the hub is further configured to determine second unstable zones based on the first mapping, the second mapping, and a second criteria.

15. The system of claim 9, wherein the network performance telemetry information comprises at least one of latency, packet loss, jitter, and bandwidth.

16. The system of claim 9, wherein the first mapping comprises a plurality of mappings, each of the plurality of mappings correlating usage of a particular user of the one or more controllers with the environment around the hub based on the location information.

17. An information handling system comprising:
- a memory;
- a wireless interface; and
- a processor configured to:
  - receive location information and network performance telemetry information from one or more controllers connected to the wireless interface;
  - generate a first mapping correlating usage of users of the one or more controllers with an environment around the wireless interface based on the location information;
  - generate a second mapping correlating the network performance telemetry information with the environment around the wireless interface;
  - determine first unstable zones based on the first mapping, the second mapping, and a first criteria; and
  - determine an action based on the first unstable zones.

18. The information handling system of claim 17, wherein the action comprises steering one or more frequency beams emitted by the wireless interface toward the first unstable zones, strengthening the one or more frequency beams, or both.

19. The information handling system of claim 17, wherein the action comprises:
- predicting, by an artificial intelligence algorithm, one or more future unstable zones based on the first unstable zones and the first mapping; and
- steering one or more frequency beams emitted by the wireless interface toward the future unstable zones, strengthening the one or more frequency beams, or both.

20. The information handling system of claim 17, wherein the first mapping comprises a plurality of mappings, each of the plurality of mappings correlating usage of a particular user of the one or more controllers with the environment around the wireless interface based on the location information.

\* \* \* \* \*